(12) United States Patent
Ryu et al.

(10) Patent No.: US 10,104,574 B2
(45) Date of Patent: Oct. 16, 2018

(54) METHOD AND APPARATUS FOR CONTROLLING WIRELESS ACCESS CONGESTION

(71) Applicant: LG ELECTRONICS INC., Seoul (KR)

(72) Inventors: Jinsook Ryu, Seoul (KR); Hyunsook Kim, Seoul (KR); Laeyoung Kim, Seoul (KR); Kyungmin Park, Seoul (KR); Taehyeon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/912,570

(22) PCT Filed: Sep. 22, 2014

(86) PCT No.: PCT/KR2014/008788
§ 371 (c)(1),
(2) Date: Feb. 17, 2016

(87) PCT Pub. No.: WO2015/041493
PCT Pub. Date: Mar. 26, 2015

(65) Prior Publication Data
US 2016/0198359 A1    Jul. 7, 2016

Related U.S. Application Data

(60) Provisional application No. 61/880,969, filed on Sep. 22, 2013.

(51) Int. Cl.
*H04W 28/02* (2009.01)
*H04W 36/22* (2009.01)
(52) U.S. Cl.
CPC ....... *H04W 28/0289* (2013.01); *H04W 36/22* (2013.01)

(58) Field of Classification Search
None
See application file for complete search history.

(56) References Cited

U.S. PATENT DOCUMENTS

2007/0177510 A1    8/2007    Natarajan et al.
2010/0284278 A1    11/2010   Alanara
(Continued)

FOREIGN PATENT DOCUMENTS

CN    101346971    1/2009
CN    102077532    5/2011
(Continued)

OTHER PUBLICATIONS

European Patent Office Application Serial No. 14845715.3, Search Report dated Apr. 10, 2017, 9 pages.
3rd Generation Partnership Project (3GPP), "Technical Specification Group Services and System Aspects; System Enhancements for User Plane Congestion Management (Release 12)," 3GPP TR 23.705 V0.7.0, XP050725399, Aug. 2013, 40 pages.
(Continued)

*Primary Examiner* — Mohammad S Adhami
(74) *Attorney, Agent, or Firm* — Lee, Hong, Degerman, Kang & Waimey

(57) ABSTRACT

The present invention relates to a wireless communication system and, more specifically, to a method and an apparatus for controlling wireless access congestion. A method by which a target cell supports a handover in a wireless communication system, according to one embodiment of the present invention, comprises: a step for receiving, from a source cell by the target cell, congestion control information for a terminal handed over from the source cell to the target cell; and a step for congestion controlling, by the target cell, the terminal on the basis of the congestion control information. The congestion control information includes whether a drop in service priority for the terminal occurs in the source cell.

12 Claims, 11 Drawing Sheets

(56) References Cited

U.S. PATENT DOCUMENTS

| | | | | |
|---|---|---|---|---|
| 2014/0022904 | A1* | 1/2014 | Ahmad | H04W 28/0289 370/235 |
| 2015/0003280 | A1* | 1/2015 | Colban | H04W 28/0252 370/253 |
| 2016/0112896 | A1* | 4/2016 | Karampatsis | H04W 28/0252 370/230.1 |

FOREIGN PATENT DOCUMENTS

| | | |
|---|---|---|
| CN | 102469510 | 5/2012 |
| KR | 10-2008-0095255 | 10/2008 |
| KR | 10-2010-0112172 | 10/2010 |
| KR | 10-2011-0026521 | 3/2011 |
| KR | 10-2012-0113673 | 10/2012 |
| WO | 2006101168 | 9/2006 |
| WO | 2011151950 | 12/2011 |
| WO | 2013/133665 | 9/2013 |

OTHER PUBLICATIONS

LG Electronics, "Consideration on starvation problem of RAN-based solution", S2-134195, SA WG2 Meeting S2#100, Nov. 2013, 6 pages.

PCT International Application No. PCT/KR2014/008788, Written Opinion of the International Searching Authority dated Nov. 19, 2014, 17 pages.

Ericsson, "Differentiated charging of packet marked flows", SA WG2 Meeting #99, S2-133222, Sep. 2013, 4 pages.

State Intellectual Property Office of the People's Republic of China Application Serial No. 201480052110.0, Office Action dated Jun. 5, 2018, 18 pages.

3rd Generation Partnership Project (3GPP), "Technical Specification Group Services and System Aspects; System Enhancements for User Plane Congestion Management (Release 12)," 3GPP TR 23.705 V0.7.0, Aug. 2013, 38 pages.

* cited by examiner (a) Control-Plane Protocol Stack (b) User-Plane Protocol Stack

METHOD AND APPARATUS FOR CONTROLLING WIRELESS ACCESS CONGESTION

CROSS-REFERENCE TO RELATED APPLICATIONS

This application is the National Stage filing under 35 U.S.C. 371 of International Application No. PCT/KR2014/008788, filed on Sep. 22, 2014, which claims the benefit of U.S. Provisional Application No. 61/880,969, filed on Sep. 22, 2013, the contents of which are all hereby incorporated by reference herein in their entirety.

TECHNICAL FIELD

The present invention relates to a wireless communication system, and more particularly, to a method and apparatus for controlling wireless congestion.

BACKGROUND ART

Users have recently used more and more data in wireless communication systems. In spite of increasing capacity and throughput of mobile communication systems, network congestion still takes place according to users' manners, regions, and time zones in using mobile communication. For example, if a large number of individual users requesting a service consuming much radio resources are concentrated in a specific cell, network congestion may occur. The network congestion may be more highly likely to occur in the daytime than at night. The network congestion may be an obstacle to a new user's access to a network or provisioning of a requested service to an individual user.

Various techniques are under discussion to control network congestion. Conventional congestion control schemes are based on solutions such as differential support of a specific user, a specific bearer, or a specific Internet Protocol (IP) flow according to a specific priority level. In this case, some users may not receive a service for a long time (this may be called radio resource starvation).

Particularly, if handover occurs due to movement of a user, the starvation problem may not be overcome. In a Core Network (CN)-based congestion control scheme, even though handover occurs in a Radio Access Network (RAN), a management node of a CN is not changed and thus congestion control may be possible. However, a conventional RAN-based congestion control scheme does not overcome the starvation problem during handover.

DISCLOSURE

Technical Problem

An object of the present invention devised to solve the conventional problem is to provide a method for controlling network congestion, which can overcome starvation and unfairness.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for supporting handover by a target cell in a wireless communication system includes receiving, from a source cell, congestion control information about a User Equipment (UE) by the target cell, the UE performing handover from the source cell to the target cell, and performing congestion control on the UE based on the congestion control information by the target cell. The congestion control information includes information indicating whether the source cell has decreased a service priority level for the UE.

In another aspect of the present invention, a method for supporting handover by a source cell in a wireless communication system includes transmitting, to a target cell by the source cell, congestion control information about a UE served by the source cell. The congestion control information is used for performing congestion control on the UE by the target cell, and includes information indicating whether the source cell has decreased a service priority level for the UE.

In another aspect of the present invention, a target cell apparatus for supporting handover in a wireless communication system includes a transceiver module, and a processor. The processor is configured to control the transceiver module to receive, from a source cell, congestion control information about a UE performing handover from the source cell to the target cell, and to perform congestion control on the UE based on the congestion control information, and the congestion control information includes information indicating whether the source cell has decreased a service priority level for the UE.

In another aspect of the present invention, a source cell apparatus for supporting handover in a wireless communication system includes a transceiver module, and a processor. The processor is configured to control the transceiver module to transmit, to a target cell, congestion control information about a UE served by the source cell, and the congestion control information is used for performing congestion control on the UE by the target cell, and includes information indicating whether the source cell has decreased a service priority level for the UE.

The followings are applicable commonly to the embodiments of the present invention.

The congestion control information may include at least one of information about a delivery time of data with the service priority level decreased for the UE by the source cell, information indicating at least one of a number, amount, and rate of packets discarded for the UE by the source cell, and information indicating whether the at least one of the number, amount, and rate of discarded packets exceeds a predetermined threshold.

The performing of congestion control on the UE may include, if the source cell has continuously decreased the service priority level for the UE, assigning a higher priority level to the UE than a previous priority level set for the UE.

The performing of congestion control on the UE may include, if the source cell has continuously decreased the service priority level for the UE, allowing a bit rate to the UE, the bit rate being equal to or greater than a previous maximum bit rate set for the UE.

The congestion control information may be included in a message transmitted from the source cell to the target cell during X2 handover.

The congestion control information may be included in at least one of a handover request message and a Sequence Number (SN) status transfer message.

The congestion control information may be included in a message transmitted from the source cell to the target cell during S1 handover.

The congestion control information may be included in at least one of a handover required message, an evolved Node B (eNB) status transfer message, and a UE context release complete message.

The congestion control information may include congestion control information for each of one or more bearers, and the congestion control may be performed on each of the one or more bearers by the target cell.

The congestion control information may include congestion control information for each of one or more flows of a specific bearer for the UE, and the congestion control may be performed on each of the one or more flows by the target cell.

The forgoing comprehensive description and following detailed description of the present invention are mere examples given to additionally describe the present invention described in the appended claims.

Advantageous Effects

According to the present invention, a network congestion control method which can overcome starvation and unfairness can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
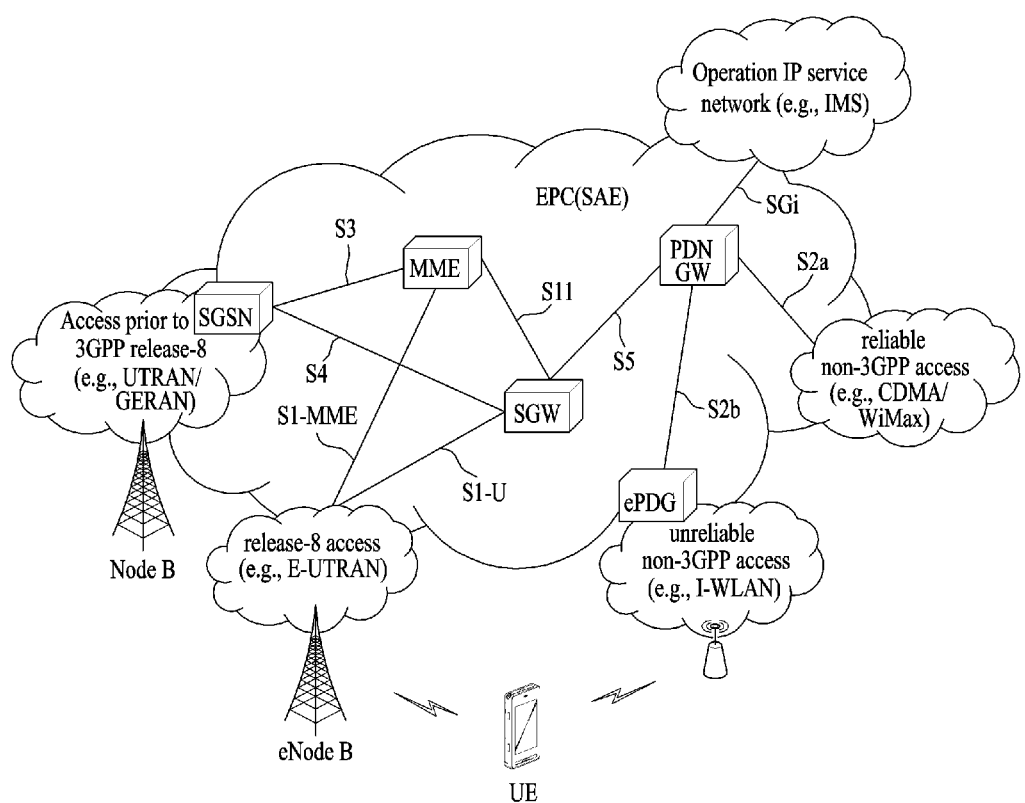
FIG. 1 illustrates an overall structure of an Evolved Packet System (EPS) including an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802 series, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on the 3GPP LTE and LTE-A systems. However, the technical features of the present invention are not limited thereto.

Terms used in the present disclosure are defined as follows.

UMTS (Universal Mobile Telecommunications System): a $3^{rd}$ Generation (3G) mobile communication technology based on Global System for Mobile Communication (GSM) developed by the 3GPP.

EPS (Evolved Packet System): a network system including an Evolved Packet Core (EPC) which is a Packet Switched (PS) core network based on Internet Protocol (IP) and an access network such as LTE/UMTS Terrestrial Radio Access Network (UTRAN). The EPS is a network evolved from UMTS.

Node B: a Base Station (BS) of GERAN/UTRAN, which is installed outdoors and has macro cell-level coverage.

eNode B (eNB): a BS of LTE, which is installed outdoors and has macro cell-level coverage.

UE (User Equipment): a user device. A UE may also be referred to as a terminal, a Mobile Equipment (ME), a Mobile Station (MS), or the like. In addition, the UE may be a portable device such as a laptop computer, a portable phone, a Personal Digital Assistant (PDA), a smartphone, or a multimedia device, or a non-portable device such as a Personal Computer (PC) or a vehicle-mounted device. The UE is capable of communicating in a 3GPP spectrum such as LTE and/or a non-3GPP spectrum such as Wireless Fidelity (WiFi) and a public safety spectrum.

RAN (Radio Access Network): a unit including a Node B, an eNode B, and a Radio Network Controller (RNC) for controlling the Node B and the eNode B in a 3GPP network, which is present between a UE and a Core Network (CN) and provides connectivity to the CN.

RANAP (RAN Application Part): an interface between a RAN and a control node of a CN (e.g., Mobility Management Entity (MME)/Serving GPRS (General Packet Radio Service) Support Node (SGSN)/Mobile Switching Center (MSC)).

PLMN (Public Land Mobile Network): a network configured for the purpose of providing mobile communication services to individuals. This network may be configured on an operator basis.

HNB (Home Node B): a Customer Premises Equipment (CPE) that provides UTRAN coverage. For more details, refer to Technical Specification (TS) 25.467.

HeNB (Home eNode B): a CPE that provides Evolved UTRAN (E-UTRAN) coverage. For more details, refer to TS 36.300.

CSG (Closed Subscriber Group): a subscriber group allowed to access one or more CSG cells within a PLMN, as a member of a CSG of a H(e)NB.

PDN (Packet Data Network) connection: a logical connection between a UE represented by one IP address (one IPv4 address and/or one IPv6 prefix) and a PDN represented by an Access Point Name (APN).

EPC (Evolved Packet Core)

FIG. 1 is a view schematically illustrating the architecture of an Evolved Packet System (EPS) including an Evolved Packet Core (EPC).

The EPC is a core element of System Architecture Evolution (SAE) for improving the performance of 3GPP technology. SAE corresponds to a study item for deciding a network structure supporting mobility among various types of network. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In a legacy mobile communication system (e.g., 2nd or 3rd generation mobile communication system), a core network function is implemented through two separated sub-domains, e.g., Circuit-Switched (CS) sub-domain for sound and Packet-Switched (PS) sub-domain for data. However, in a 3GPP LTE system which is evolved from the 3rd generation communication system, the CS and PS sub-domains are unified into a single IP domain. For example, in the 3GPP LTE system, IP-capable UEs can be connected via an IP-based base station (e.g., eNodeB (evolved Node B)), an EPC, an application domain (e.g., IMS (IP Multimedia Subsystem)). That is, the EPC is a structure inevitably required to implement end-to-end IP service.

The EPC may include various components and FIG. 1 illustrates a few of the components, e.g., Serving GateWay (SGW), Packet Data Network GateWay (PDN GW), Mobility Management Entity (MME), Serving GPRS (General Packet Radio Service) Supporting Node (SGSN), and enhanced Packet Data Gateway (ePDG).

The SGW operates as a boundary point between a Radio Access Network (RAN) and a core network and is an element which performs a function for maintaining a data path between an eNodeB and a PDG GW. In addition, if a UE moves across an area served by an eNodeB, the SGW serves as a local mobility anchor point. That is, packets may be routed via the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility management with another 3GPP network such as RAN defined before 3GPP Release-8, e.g., UTRAN or GSM (Global System for Mobile communication)/EDGE (Enhanced Data rates for GSM Evolution) Radio Access Network (GERAN).

The PDN GW (or P-GW) corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) or WiMax).

Although the SGW and the PDN GW are configured as separate gateways in the network architecture of FIG. 1, the two gateways may be implemented according to a single gateway configuration option.

The MME performs signaling and control functions to support access of a UE for network connection, network resource allocation, tracking, paging, roaming and handover. The MME controls control plane functions related to subscriber and session management. The MME manages a large number of eNodeBs and performs signaling for selection of a typical gateway for handover to another 2G/3G network. In addition, the MME performs security procedures, terminal-to-network session handling, idle terminal location management, etc.

The SGSN handles all packet data such as mobility management and authentication of a user for another 3GPP network (e.g., GPRS network).

The ePDG serves as a security node for an untrusted non-3GPP network (e.g., I-WLAN, Wi-Fi hotspot, etc.).

As described above in relation to FIG. 1, an IP-capable UE may access an IP service network (e.g., IMS) provided by an operator, via various elements in the EPC based on non-3GPP access as well as 3GPP access.

FIG. 1 also illustrates various reference points (e.g., S1-U, S1-MME, etc.). In the 3GPP system, a conceptual link connecting two functions of different functional entities of E-UTRAN and EPC is defined as a reference point. Table 1 lists the reference points illustrated in FIG. 1. In addition to the examples of Table 1, various reference points may be present according to network architectures.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |

TABLE 1-continued

| Reference Point | Description |
|---|---|
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing a user plane with related control and mobility support between the trusted non-3GPP access and the PDNGW. S2b is a reference point for providing a user plane with related control and mobility support between the ePDG and the PDNGW.

Figure 2:
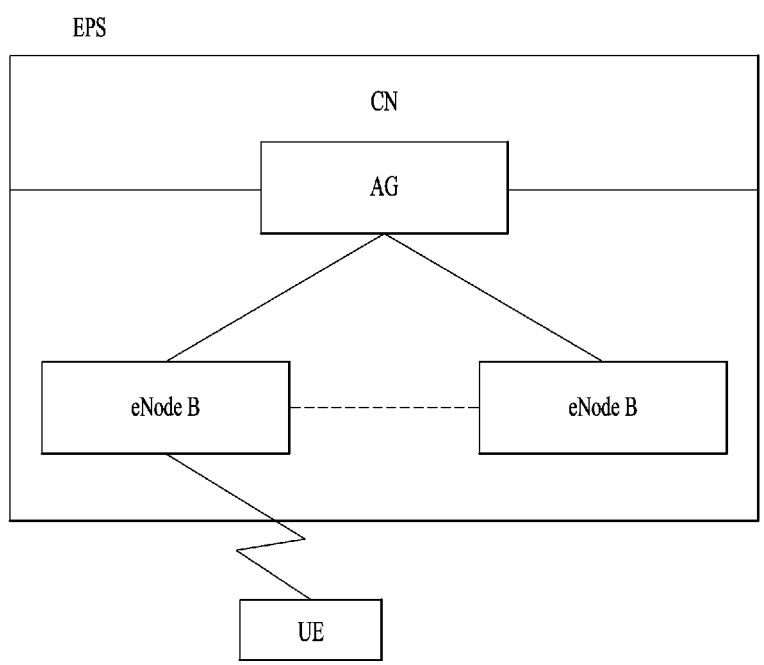
FIG. 2 illustrates a configuration of an Evolved UMTS Terrestrial Radio Access Network (E-UTRAN) connected to an EPC as an exemplary wireless communication system.

FIG. 2 is a diagram schematically illustrating a network structure of an E-UTRAN connected to an EPC as an exemplary wireless communication system. EPS is a system evolved from a legacy UMTS, under standardization in the 3GPP. EPS may be generally referred to as an LTE system. For details of the technical specifications of UMTS and EPS, refer to Release 7 and Release 8 of "3rd Generation Partnership Project; Technical Specification Group Radio Access Network".

Referring to FIG. 2, the EPS includes a UE, eNBs, and an Access Gateway (AG) which is located at an end of the E-UTRAN and connected to an external network. The eNBs may simultaneously transmit multiple data streams for a broadcast service, a multicast service, and/or a unicast service.

One eNB manages one or more cells. A cell is configured to use one of bandwidths of 1.25, 2.5, 5, 10, 15, and 20 MHz to provide a Downlink (DL) or Uplink (UL) transmission service to multiple UEs. Different cells may be configured to provide different bandwidths. The eNB controls data transmission and reception to and from a plurality of UEs. Regarding DL data, the eNB notifies a UE of a time/frequency area in which data is to be transmitted, coding, a data size, and Hybrid Automatic Repeat and reQuest (HARQ)-related information by transmitting DL scheduling information to the UE. In addition, regarding UL data, the eNB notifies a UE of an available time/frequency area, coding, a data size, and HARQ-related information by transmitting UL scheduling information to the UE. An interface for transmitting user traffic or control traffic may be used between eNBs. A Core Network (CN) may include an AG and a network node for user registration of UEs. The AG manages mobility of a UE on a Tracking Area (TA) basis, each TA including a plurality of cells.

Although wireless communication technology has been developed up to LTE based on Wideband Code Division Multiple Access (WCDMA), demands and expectations of users and service providers are on the increase. In addition, since other wireless access technologies are under development, new advances in technology are required to secure future competitiveness. For example, reduction of cost per bit, increased service availability, flexible use of a frequency band, a simplified structure, an open interface, appropriate power consumption of a UE, etc. are required.

The 3GPP has recently worked on standardization of LTE-beyond technology. Herein, the technology will be referred to as 'LTE-Advanced (LTE-A)'. The LTE-A system seeks to support a wideband of up to 100 MHz. For this purpose, the LTE-A system adopts Carrier Aggregation (CA) by which to achieve a broad band using a plurality of frequency blocks. In CA, a plurality of frequency blocks are used as a single large logical frequency band, for a broader frequency band. The bandwidth of each frequency block may be defined based on the bandwidth of a system block used in the LTE system. Each frequency block may be referred to as Component Carrier (CC) or cell.

Figure 3:
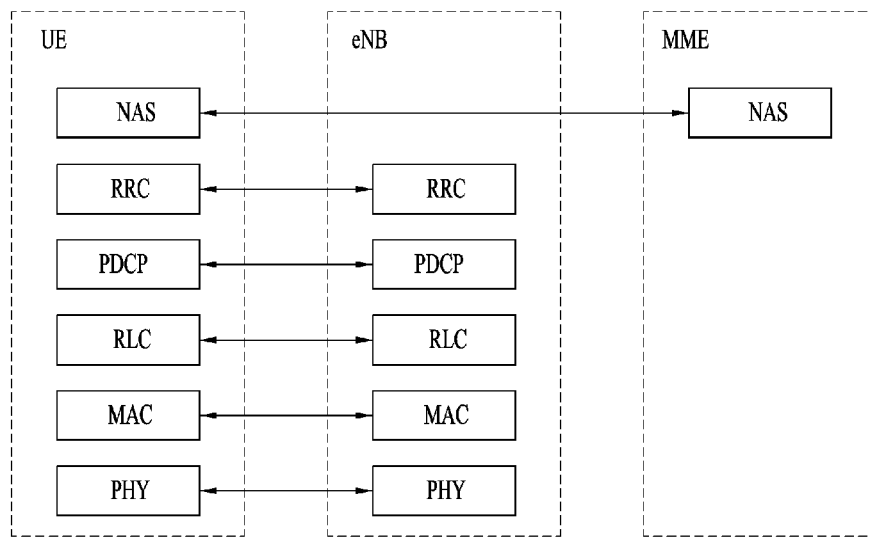
FIG. 3 illustrates the architecture of control-plane and user-plane radio interface protocols between a User Equipment (UE) and an E-UTRAN, conforming to the $3^{rd}$ Generation Partnership Project (3GPP) radio access network standards.
Figure 3:
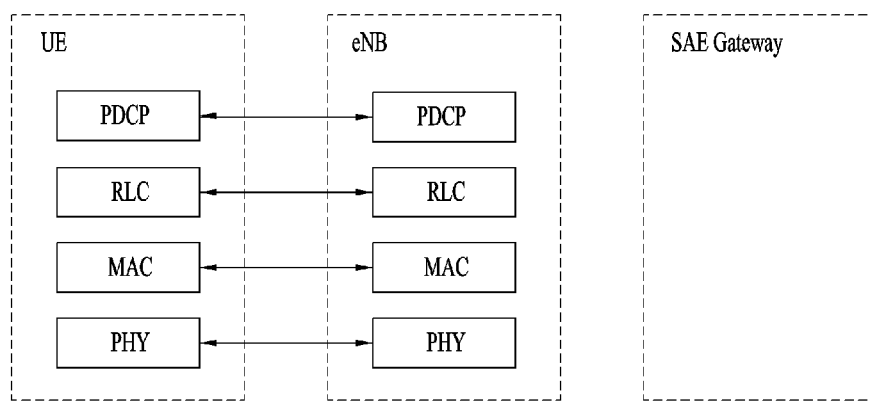

FIG. 3 illustrates the architecture of control-plane and user-plane radio interface protocols between a UE and an E-UTRAN, conforming to the 3GPP radio access network standards. A control plane refers to a path used for transmission of control messages that the UE and the network use to manage a call. A user plane refers to a path in which data generated in an application layer, for example, voice data or Internet packet data is transmitted.

A physical layer at Layer 1 provides an information transfer service to a higher layer using physical channels. The physical layer is connected to a Medium Access Control (MAC) layer above the physical layer through transport channels. Data is transmitted between the MAC layer and the physical layer on a transport channel. Data is transmitted between the physical layers of a transmitter and a receiver through a physical channel. The physical channel uses time and frequency as radio resources. Specifically, the physical channel is modulated in Orthogonal Frequency Division Multiple Access (OFDMA) on DL and in Single-Carrier Frequency Division Multiple Access (SC-FDMA) scheme on UL.

The MAC layer at Layer 2 provides a service to its higher layer, Radio Link Control (RLC) through a logical channel. The RLC layer at L2 supports reliable data transmission. The functionality of the RLC layer may be implemented in a functional block within the MAC layer. At L2, a Packet Data Convergence Protocol (PDCP) layer performs header compression to reduce unnecessary control information for efficient transmission of an Internet Protocol (IP) packet such as an IPv4 or IPv6 packet through a radio interface having a narrow bandwidth.

A Radio Resource Control (RRC) layer at the lowest of L3 is defined only in the control plane. The RRC layer controls logical channels, transport channels, and physical channels in relation to configuration, re-configuration, and release of radio bearers. A radio bearer refers to a service provided by L2 to transmit data between the UE and the network. To this end, the RRC layers of the UE and the network exchange RRC messages. If an RRC connection has been established between the RRC layer of the radio network and the RRC layer of the UE, the UE is in an RRC connected mode, and otherwise, the UE is in an RRC idle mode. A Non-Access Stratum (NAS) layer above the RRC layer performs functions such as session management and mobility management.

A cell managed by an eNB is configured to use one of bandwidths of 1.25, 2.5, 5, 10, 15, and 20 MHz to provide a DL or UL transmission service to multiple UEs. Different cells may be configured to provide different bandwidths.

DL transport channels for data transmission from the network to the UE include a Broadcast Channel (BCH) for transmitting system information, a Paging Channel (PCH) for transmitting paging messages, and a DL Shared Channel (SCH) for transmitting user traffic or control messages. Traffic or control messages of a DL multicast or broadcast service may be transmitted on the DL SCH or an additional DL Multicast Channel (MCH). Meanwhile, UL transport channels for data transmission from the UE to the network include a Random Access Channel (RACH) for transmitting initial control messages and a UL SCH for transmitting user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 4:
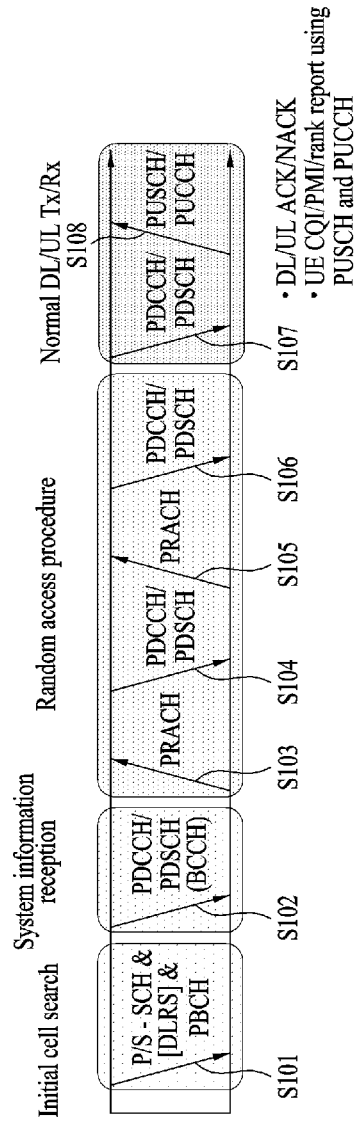
FIG. 4 illustrates physical channels used in a 3GPP system and a general signal transmission method using the physical channels.

FIG. 4 illustrates physical channels used in a 3GPP system and a general signal transmission method using the physical channels.

When a UE is powered on or enters a new cell, the UE performs initial cell search (S301). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S302).

Meanwhile, when the UE initially accesses the eNB or has no radio resources for signal transmission, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of contention-based random access, the UE may additionally perform a contention resolution procedure.

After the above procedure, the UE may receive a PDCCH/PDSCH from the eNB (S307) and transmit a Physical Uplink Shared Channel (PUSCH)/Physical Uplink Control Channel (PUCCH) to the eNB (S308), in a general UL/DL signal transmission procedure. Particularly, the UE receives Downlink Control Information (DCI) on a PDCCH. The DCI includes control information such as resource allocation information for the UE and is configured in a different format according to its usage.

Control information that the UE transmits to the eNB on UL or the UE receives from the eNB on DL includes a DL/UL Acknowledgement/Negative Acknowledgement (ACK/NACK) signal, a Channel Quality Indicator (CQI), a Precoding Matrix Index (PMI), a Rank Indicator (RI), etc. In the 3GPP LTE system, the UE may transmit control information such as a CQI/PMI/RI on a PUSCH and/or a PUCCH.

Figure 5:
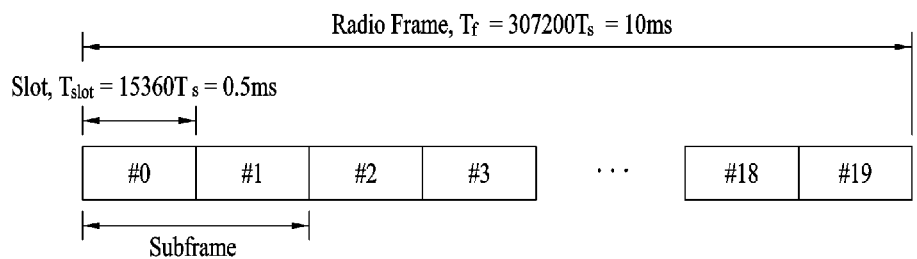
FIG. 5 illustrates an exemplary structure of a radio frame used in a Long Term Evolution (LTE) system.

FIG. 5 illustrates an exemplary structure of a radio frame used in an LTE system.

Referring to FIG. 5, the radio frame has a length of 10 ms (327200×Ts) and includes 10 equal-sized subframes. Each of the subframes has a length of 1 ms and includes two slots. Each slot has a length of 0.5 ms (15360 Ts). Herein, Ts represents a sampling time determined by Ts=1/(15 kHz× 2048)=3.2552×10−8 (about 33 ns). Each slot includes a plurality of Orthogonal Frequency Division Multiplexing (OFDM) symbols in time and a plurality of Resource Blocks (RBs) in frequency. In the LTE system, one RB includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made to the number of subframes included in a radio frame, the number of slots included in a subframe, or the number of OFDM symbols included in a slot.

In the case of a normal Cyclic Prefix (CP), one subframe may include 14 OFDM symbols. The first to third OFDM symbols may be used as a control region and the remaining 11 to 13 OFDM symbols may be used as a data region, according to a subframe configuration. Control channels allocated to the control region include a Physical Control Format Indicator Channel (PCFICH), a Physical Hybrid-ARQ Indicator Channel (PHICH), a Physical Downlink Control Channel (PDCCH), etc.

The PDCCH is allocated to the first n OFDM symbols of a subframe. Here, n is an integer equal to or greater than 1, indicated by the PCFICH. The PDCCH delivers information associated with resource allocation of transport channels, PCH and DL-SCH, a UL scheduling grant, HARQ information, etc. to each UE or UE group. The PCH and the DL-SCH are transmitted through a PDSCH. Therefore, the eNB and the UE transmit and receive data through the PDSCH except for particular control information or service data.

Information indicating one or more UEs to which PDSCH data is to be transmitted and information indicating how the UEs should receive and decode the PDSCH data are transmitted on the PDCCH. For example, it is assumed that the Cyclic Redundancy Check (CRC) of a specific PDCCH is masked by Radio Network Temporary Identity (RNTI) 'A' and information about data transmitted in radio resources 'B' (e.g. a frequency position) and DCI format 'C', that is, transport format information (e.g. a transport block size, a modulation scheme, coding information, etc.), is transmitted in a specific subframe. Then, a UE located in a cell monitors the PDCCH, that is, blind-decodes the PDCCH in a search space using its RNTI information. If one or more UEs have RNTI 'A', the UEs receive the PDCCH and receive a PDSCH indicated by 'B' and 'C' based on the received information of the PDCCH.

A UL subframe is divided into a region to which a PUCCH is allocated to transmit control information and a region to which a PUSCH is allocated to transmit user data. The PUSCH is allocated to the middle of the subframe, whereas the PUCCH is allocated to both ends of the data region in the frequency domain. Control information transmitted on the PUCCH includes an HARQ ACK/NACK, a CQI representing a DL channel state, an RI for Multiple Input and Multiple Output (MIMO), a Scheduling Request (SR) indicating a request for allocation of UL resources, etc.

Conventional Congestion Control Schemes

A technique called User Plane Congestion Management (UPCON) is under discussion as a network congestion control scheme in a standardization meeting for a 3GPP system structure. For details, refer to TS 22.805 and Technical Report (TR) 23.705.

UPCON is a technique in which upon detection of congestion of a RAN link, a CN controls the congestion by changing a policy rule for a UE or a service and thus decreasing a Quality of Service (QoS) level or by marking the priority levels of IP flows in the same bearer (a bearer may be generated per QoS). For example, a priority level may be assigned per UE, per bearer within one UE, or per IP flow within one bearer. Accordingly, if congestion occurs, a UE, bearer, or IP flow having a higher priority level may first be supported differentially, whereas the amount or period of allocated resources may be decreased for a UE, bearer, or IP flow having a lower priority level.

Specifically, UPCON maintains service quality for a higher-priority user or service during congestion by defining subscription classes (e.g., premium, gold, silver, etc.) for individual users or prioritizing packet services in such a manner that a lower priority level may be assigned to a specific service (e.g., a third-party service). That is, when congestion occurs, the performance of a specific UE or service may be reduced, thus minimizing the performance degradation of a relatively important user or service.

According to the user or service differentiation scheme, resources may not be allocated to a specific user or service for a long time (i.e., due to accumulated differentiation). As a result, the user or service may experience data dropping or starvation.

Now, problems encountered with conventional congestion control schemes will be described in great detail.

According to the conventional congestion control schemes, congestion in a cellular network may be controlled in various manners. For example, access may be barred, an on-going call may be dropped, or an established bearer may be released, depending on a congestion situation. UPCON under discussion has been proposed to control congestion flexibly on a subscription information basis or on a service basis, and network-based congestion mitigation, RAN-based congestion mitigation, UE-based congestion mitigation are under discussion.

In the network-based congestion mitigation scheme, when a node of a network (i.e., a CN) receives a report of a congestion situation from a node of a RAN (e.g., an eNB), the CN solves the congestion of the RAN by policy control or packet dropping of a P-GW. In the case of network-based congestion mitigation and RAN-based congestion mitigation, upon occurrence of congestion, differential congestion control may be performed on a UE according to the subscription class of a user and the type of a packet flow in use. Meanwhile, the standardization meeting has not defined a solution to control of starvation, that is, non-provisioning of a service to a specific UE or packet flow for a long time. Instead, the starvation meeting has made it clear that the starvation is an issue to be tackled during implementation by a network service provider or a manufacturer.

In the network-based congestion control scheme, since the CN is responsible for managing congestion, continuous QoS control is possible irrespective of movement of a UE. Thus, it is expected that the starvation problem can be handled in the network-based congestion control scheme.

On the other hand, in the RAN-based congestion control scheme, radio resources (e.g., DL resources) may be allocated to a UE under the control of an eNB. For example, it may occur that a UE, which has not been allocated radio resources due to its low priority level or class in a congestion situation, moves to another cell (or another eNB). In this case, if information about radio resources for congestion mitigation is not shared between cells (or eNBs), the UE may experience more severe starvation. If UEs are continuously controlled by one cell (or eNB), the cell (or eNB) may compensate a UE likely to experience starvation by allocating resources to the UE from time to time (or periodically). However, if the UE moves and resource allocation information about the UE is not shared between the cells (or eNBs), a new cell (or eNB) to which the UE has moved may not allocate resources to the UE either.

Figure 6:
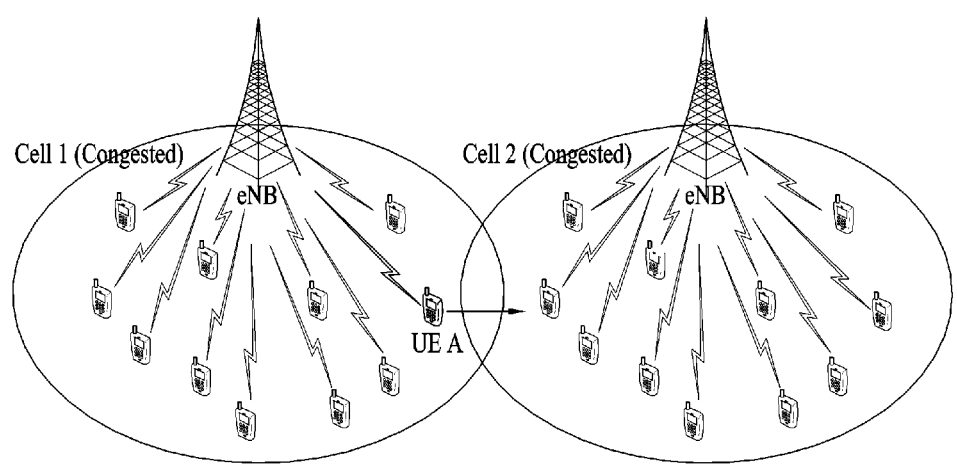
FIG. 6 illustrates an exemplary conventional congestion situation.

FIG. 6 illustrates an exemplary conventional congestion situation.

With reference to the example of FIG. 6, non-management of starvation for a specific UE in a conventional congestion control scheme will be described. As illustrated in FIG. 6, it may be assumed that UE A moves from Cell 1 to Cell 2. It is assumed that resources have not been allocated to UE A having a low priority level (or a specific bearer or a specific packet flow of UE A) for a long time due to a congestion situation of Cell 1. UE A may move into the coverage of a new cell, Cell 2 and it is assumed that Cell 2 is also congested. When UE A moves to Cell 2, Cell 2 has no knowledge of a resource allocation history of UE A in Cell 1. Thus, Cell 2 is not aware that UE A experiences starvation and thus may not manage the starvation (e.g., may not allocate resources to UE A).

Figure 7:
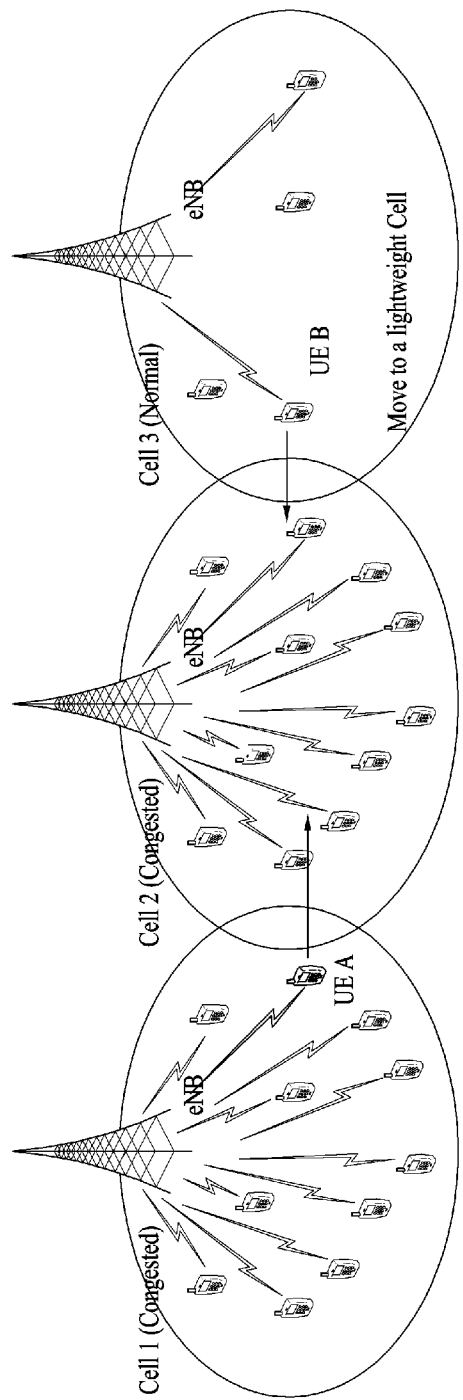
FIG. 7 illustrates another exemplary conventional congestion situation.

FIG. 7 illustrates another exemplary conventional congestion situation.

With reference to the example of FIG. 7, unfairness to a specific UE in a conventional congestion control scheme will be described. As illustrated in FIG. 7, it is assumed that UE A moves from congested Cell 1 to congested Cell 2, and UE B moves from non-congested (i.e., normal) Cell 3 to congested Cell 2. It is also assumed that UE A and UE B have the same subscription class and request a service of the same application. Since congestion control is needed in Cell 2 due to congestion, both UE A and UE B may be congestion-control targets (e.g., UE A and UE B may have lower priority levels than the other UEs). Although UE A and UE B should experience throughput decrease to similar degrees in terms of fairness, fairness cannot be expected from the conventional technology. For example, UE A may have experienced a great throughput decrease due to its lower priority level in resource allocation in congested Cell 1, whereas UE B may have received a normal service in non-congested Cell 3. However, Cell 2 has no way to acquire congestion control information of the neighbor cells (or congestion control histories of the UEs). Therefore, if Cell 2 allocates resources to one of UE A and UE B (e.g., to UE B), although UE A receives the service of the same application with the same subscription class as UE B, UE A receives the service with lower throughput or experiences more severe starvation. As a consequence, unfairness may occur. If Cell 2 allocates resources to UE A and UE B according to the same priority level, although UE A receives the service of the same application with the same subscription class as UE B, UE A receives the service with lower throughput or experiences more severe starvation in Cell 1 and Cell 2 than UE B in Cell 3 and Cell 2. Thus, the unfairness problem is produced.

Accordingly, the present invention proposes a method for compensating a UE or service which is relatively discriminated against (i.e., minimizing starvation or unfairness), while maintaining the basic principle of controlling congestion according to priority.

Improved Congestion Control Method

The present invention proposes an improved method for user-plane congestion control in a RAN link. Particularly, the present invention proposes a new method for RAN-based user-plane congestion control, when a UE moves to another cell (or during handover).

According to the present invention, it is proposed as an improved method for congestion control in the case of handover of a UE between cells that a source cell/eNB (or a first cell/eNB) transmits congestion control information about the handover UE to a target cell/eNB (or a second cell/eNB). Therefore, the afore-described starvation and unfairness problem can be overcome.

For example, data delivery information about a specific UE is continuously managed (or shared between cells) even when the UE moves between the cells. Thus, the starvation problem encountered when the UE has not been serviced for a long time (e.g., the problem illustrated in the example of FIG. 6) may be overcome, and the unfairness problem to UEs having the same class or priority level may be overcome (e.g., fairness may be ensured by assigning a lower service priority level to UE B moved from a normal cell than UE A moved from a congested cell or by assigning a higher service priority level to UE A moved from the congested cell than UE B moved from the normal cell in FIG. 7).

The congestion control information may include information indicating whether a service priority level has been decreased by applying congestion control to a UE, a specific bearer of the UE, or a specific flow belonging to the specific bearer. Besides, the congestion control information may further include one or more pieces of the following information: information about a differentiated (or low-priority) data delivery time for the specific UE/bearer/flow, information about the number or amount of discarded packets for the UE/bearer/flow, information indicating whether the sum of the numbers or amounts of discarded packets for the UE/bearer/flow is equal to or larger than a predetermined threshold, and information indicating the level of the sum of the numbers or amounts of discarded packets for the UE/bearer/flow.

If a target cell to which a UE has moved is congested, the target cell may perform congestion control on the UE, using congestion control information received from a serving cell. For example, the target cell may assign a higher service priority level to a UE/bearer/flow expected to starve than an original service priority level, taking into account the congestion control information. Or the target cell may assign a higher service priority level to a UE/bearer/flow expected to be serviced unfairly than an original service priority level, taking into account the congestion control information. Or the target cell may assign a lower priority level to a UE/bearer/flow other than a UE/bearer/flow expected to starve or be serviced unfairly than an original priority level, taking into account the congestion control information, thereby preventing starvation or unfairness.

Figure 8:
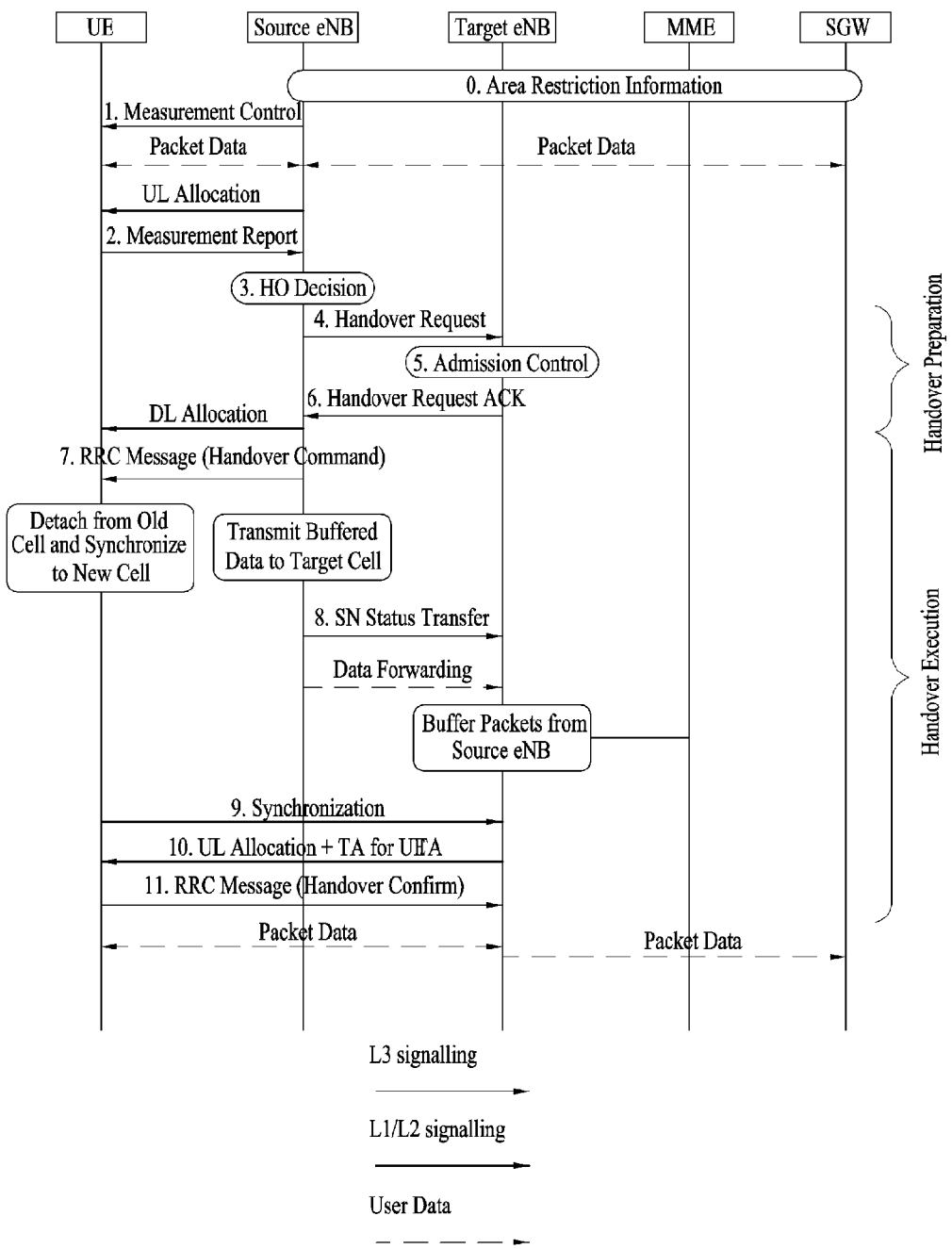
FIG. 8 illustrates a method for controlling congestion in the case of X2 handover according to an example of the present invention.

FIG. 8 illustrates a method for controlling congestion in the case of X2 handover according to an example of the present invention.

The exemplary signal flow of FIG. 8 depicts detailed steps of an intra-MME or intra-SGW handover procedure.

In step 0 of FIG. 8, a UE context of a source eNB may include access restriction information. The access restriction information may be provided during connection establishment or last TA update of a UE.

In step 1 of FIG. 8, the source eNB may provide configuration information for measurement to the UE according to the access restriction information.

Also, the source eNB may transmit and receive packets to and from the UE during measurement of the UE, and transmit and receive the packets to and from a CN. The source eNB may also allocate UL resources to the UE (UL allocation).

In step 2 of FIG. 8, the UE may transmit a measurement report to the source eNB.

In step 3 of FIG. 8, the source eNB may decide on handover of the UE based on the measurement report and Radio Resource Management (RRM) information.

In step 4 of FIG. 8, the source eNB may transmit a Handover Request message to a target eNB. Herein, the source eNB may transmit to the target eNB information needed for the target eNB to prepare for the handover (e.g., a UE X2 signaling context reference at the source eNB, a UE S1 EPC signaling context reference, a target cell ID, an RRC context including a C-RNTI of the UE used at the source eNB, and E-UTRAN Radio Access Bearers (E-RABs) (information identifying a connection between an S1 bearer and a data radio bearer corresponding to the S1 bearer)).

Additionally, congestion control information of the source eNB, proposed by the present invention, may be included in the Handover Request message. In this case, the congestion control information may be included in bearer-related information of the Handover Request message, and thus per-bearer congestion control information may be provided to the target eNB.

In step 5 of FIG. 8, the target eNB may perform admission control including determination as to whether successful handover is possible based on received E-RAB QoS information.

In step 6 of FIG. 8, the target eNB may prepare for the handover and transmit a Handover Request ACK message to the source eNB.

The source eNB may allocate DL resources to the UE even during preparation for the handover (DL allocation).

In step 7 of FIG. 8, the source eNB may transmit an RRC message for handover (e.g., an RRCConnectionReconfiguration message including mobilityControlInformation) to the UE. The RRC message may be generated by the target eNB, and the UE may receive necessary parameters (e.g., a new C-RNTI, a target eNB security algorithm ID, etc.) in the message. Also, the UE receives a Handover Command of the source eNB in the message.

Accordingly, the UE may be detached from the old cell and synchronized with the new cell. Further, the source eNB may transmit buffered data for an on-going packet to the target eNB.

In step 8 of FIG. 8, the source eNB may transmit a Sequence Number (SN) Status Transfer message to the target eNB. This is a message indicating a UL PDCP SN receiver status and a DL PDCP SN transmitter status of E-RABs.

Additionally, the congestion control information of the source eNB, proposed by the present invention, may be included in the SN Status Transfer message. In this case, the source eNB may advantageously transmit latest congestion control information to the target eNB.

Further, the source eNB may transmit data to the target eNB, and the target eNB may buffer data packets received from the source eNB.

In step 9 of FIG. 8, after receiving the RRC message in step 7, the UE may acquire synchronization with the target eNB (e.g., access the target cell on an RACH).

In step 10 of FIG. 8, the target eNB may perform UL allocation to the UE and provide Timing Advance (TA) information for the UE.

In step 11 of FIG. 8, if the UE successfully accesses the target eNB, the UE may confirm the handover by transmitting an RRC message (e.g., an RRCConnectionReconfigurationComplete message). Therefore, the target eNB may start to transmit data to the UE.

After the handover preparation and handover execution steps, a handover completion step may be performed among the target eNB, the CN (an MME or an SGW), and the source eNB. The handover completion step will not be described herein, for simplicity of description.

As described before, in the case of X2 handover, congestion control information of a source eNB, proposed by the present invention, may be provided to a target eNB in a Handover Request message (in step 4 of FIG. 8) or an SN Status Transfer message (in step 8 in FIG. 8). Or a new message may be defined and used to deliver the congestion control information during X2 handover.

Figure 9:
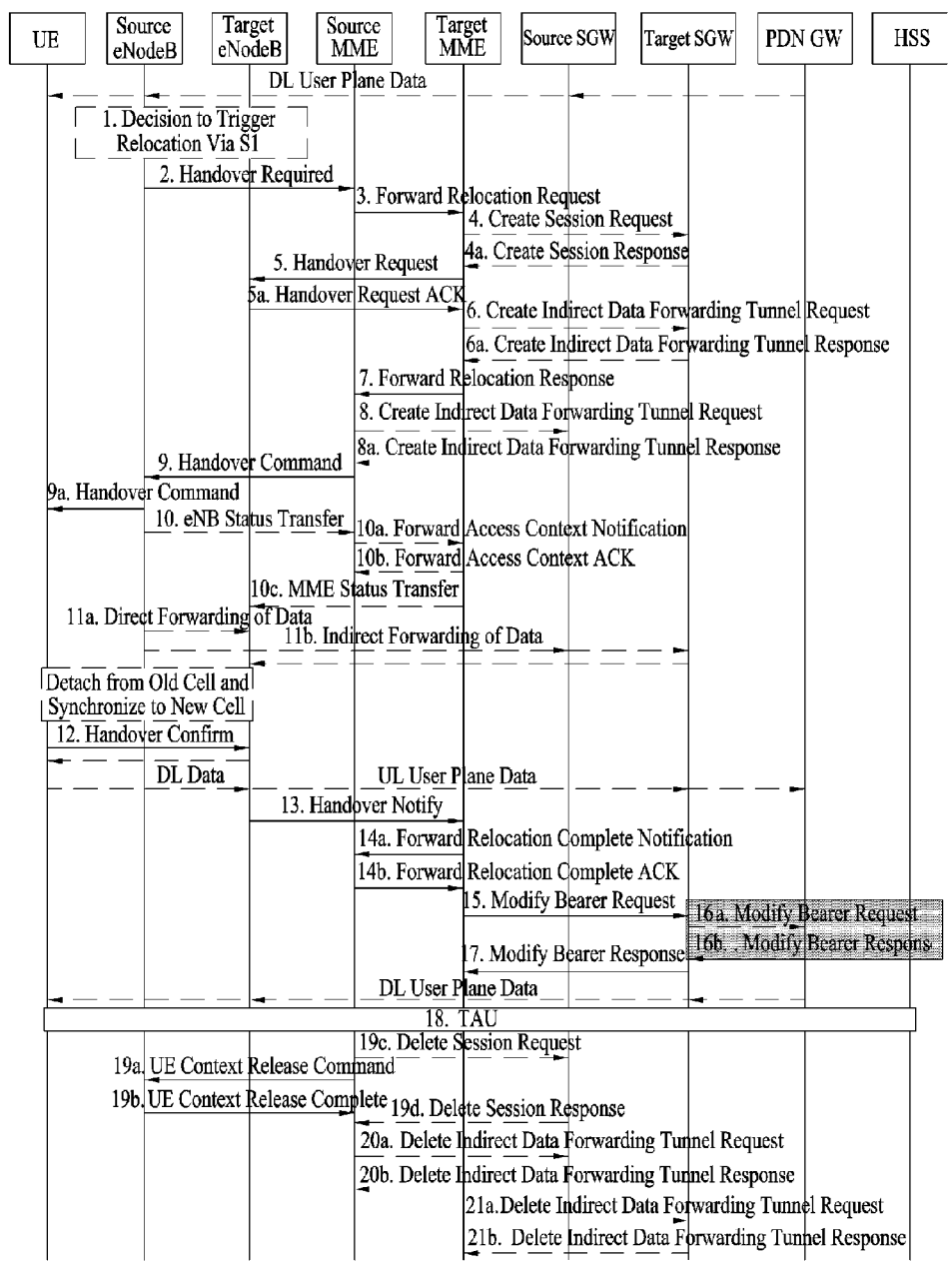
FIG. 9 illustrates a method for controlling congestion in the case of S1 handover according to an example of the present invention.

FIG. 9 illustrates a congestion control method in the case of S1 handover according to an example of the present invention.

In FIG. 9, a UE receives DL user-plane data from a source eNB, which is provided through a PDN GW, a source SGW, and the source eNB.

In step 1 of FIG. 9, the source eNB may determine to trigger relocation via S1 to a target eNB (i.e., to start S1 handover). Upon receipt of an error indication from the target eNB after X2 handover is failed in the absence of an X2 connection to the target eNB, the S1 handover may be performed.

In step 2 of FIG. 9, the source eNB may transmit a Handover Required message to a source MME. The source eNB may indicate a bearer to which data is to be delivered.

Additionally, congestion control information of the source eNB, proposed by the present invention, may be transmitted to the target eNB through an MME(s) in the Handover Required message.

In step 3 of FIG. 9, the source MME may select a target MME, and upon decision on MME relocation, the source MME may transmit a Forward Relocation Request message to the target MME.

In step 4 of FIG. 9, if the MME is relocated, the target MME may determine whether the source SGW continuously serves a UE. Otherwise, the target MME may select a new SGW (i.e., a target SGW) and transmit a Create Session Request message to the target SGW. In step 4a, the target SGW may transmit a Create Session Response message to the target MME in response to the Create Session Request message. If the MME is not relocated, the serving MME may perform this operation and the following operation. If the source SGW continues serving the UE, steps 4 and 4a may not be performed. In this case, the target SGW and the source SGW are identical.

The target MME may transmit a Handover Request message to the target eNB in step 5 of FIG. 9, and the target eNB may transmit a Handover Request ACK message to the target MME in step 6 of FIG. 9.

In step 6 of FIG. 9, if the SGW is relocated and indirect forwarding is applied, the target MME may configure a forwarding parameter by transmitting a Create Indirect Data Forwarding Tunnel Request message to the target SGW. In step 6a, the target SGW may transmit a Create Indirect Data Forwarding Tunnel Response message to the target MME in response to the Create Indirect Data Forwarding Tunnel Request message.

In step 7 of FIG. 9, if the MME is relocated, the target MME may transmit a Forward Relocation Response message to the source MME.

In step 8 of FIG. 9, if indirect forwarding is applied, the source MME may transmit a Create Indirect Data Forwarding Tunnel Request message to the source SGW. In step 8a, the source SGW may transmit a Create Indirect Data Forwarding Tunnel Response message to the source MME in response to the Create Indirect Data Forwarding Tunnel Request message.

In step 9 of FIG. 9, the source MME may transmit a Handover Command message to the source eNB. In step 9a, the source eNB may transmit a Handover Command message to the UE. Upon receipt of the Handover Command message, the UE may remove an EPS bearer corresponding to an EPS RB that the target cell has failed to receive.

In step 10 of FIG. 9, the source eNB may transmit an eNB Status Transfer message to the target eNB through an MME(s).

Additionally, the congestion control information of the source eNB, proposed by the present invention, may be transmitted to the target eNB through the MME(s) in the eNB Status Transfer message.

In step 10a of FIG. 9, in the presence of MME relocation, the source MME may transmit eNB status information to the target MME in a Forward Access Context Notification message. The target MME may transmit a Forward Access Context Acknowledge message to the source MME in response to the Forward Access Context Notification message in step 10b. In step 10c, the target MME may transmit the information to the target eNB in an MME Status Transfer message.

In step 11 of FIG. 9, the source eNB may start to transmit DL data to the target eNB, for bearers to which the data is to be delivered. This may be performed by direct data forwarding in step 11a or indirect data forwarding in step 11b.

Also, the UE may be detached from the old cell and acquire synchronization with the new cell.

If the UE succeeds in synchronization with the target cell, the UE may transmit a Handover Confirm message to the target eNB in step 12 of FIG. 9. Subsequently, the target eNB may transmit DL data forwarded by the source eNB to the UE. Further, UL user-plane data from the UE may be transmitted to the target eNB and then the target SGW and the PDN GW.

In step 13 of FIG. 9, the target eNB may transmit a Handover Notify message to the target MME.

In step 14a of FIG. 9, if the MME is relocated, the target MME may transmit a Forward Relocation Complete Notification message to the source MME. In step 14b, the source MME may transmit a Forward Relocation Complete ACK message to the target MME in response to the Forward Relocation Complete Notification message.

Irrespective of whether the MME is relocated, the source MME starts a timer for determining when to release resources of the source eNB (also, resources of the source SGW in the case of SGW relocation).

In step 15 of FIG. 9, the target MME may transmit a Modify Bearer Request message on a PDN connection basis to the target SGW.

In step 16a of FIG. 9, if the SGW is relocated, the target SGW may transmit a Modify Bearer Request message on a PDN connection basis to the PDN GW. The PDN GW may update its context field and transmit a Modify Bearer Response message to the target SGW in step 16b.

In step 17 of FIG. 9, the target SGW may transmit a Modify Bearer Response message to the target MME.

Subsequently, the UE may receive DL user-plane data from the target eNB, which is provided through the PDN GW, the target SGW, and the target eNB.

In step 18 of FIG. 9, if a TAU trigger condition is satisfied, the UE may perform a TAU procedure.

If the timer started in step 14 expires, the source MME may transmit a UE Context Release Command message to the source eNB in step 19a of FIG. 9. Thus, the source eNB may release resources related to the UE, and transmit a UE Context Release Complete message to the source MME in step 19b.

Additionally, the congestion control information of the source eNB, proposed by the present invention, may be transmitted to the target eNB through the MME(s) in the UE Context Release Complete message.

Also, if the timer started in step 14 expires and the source MME receives an SGW change indication in a Forwarding Relocation Response message, the source MME may transmit a Delete Session Request message to the source SGW to thereby delete EPS bearer resources in step 19c. In step 19d, the source SGW may transmit a Delete Session Response message to the source MME in response to the Delete Session Request message.

In step 20a of FIG. 9, if indirect forwarding is used and the timer started in step 14 expires in the source MME, the source MME may transmit a Delete Indirect Data Forwarding Tunnel Request message to the source SGW. In step 20b, the source SGW may transmit a Delete Indirect Data Forwarding Tunnel Response message to the source MME in response to the Delete Indirect Data Forwarding Tunnel Request message.

In step 21a of FIG. 9, if indirect forwarding is used and the SGW is relocated, upon expiration of the timer started in step 14 in the source MME, the target MME may transmit a Delete Indirect Data Forwarding Tunnel Request message to the target SGW. In step 21b, the target SGW may transmit a Delete Indirect Data Forwarding Tunnel Response message to the target MME in response to the Delete Indirect Data Forwarding Tunnel Request message.

As described before, in the case of S1 handover, congestion control information of a source eNB, proposed by the present invention, may be transmitted to a target eNB in a Handover Required message (in step 2 of FIG. 9), an eNB Status Transfer message (in step 10 of FIG. 9), or a UE Context Release Complete message (in step 19b of FIG. 9). Or a new message may be defined and used to transmit the congestion control information during S1 handover.

Figure 10:
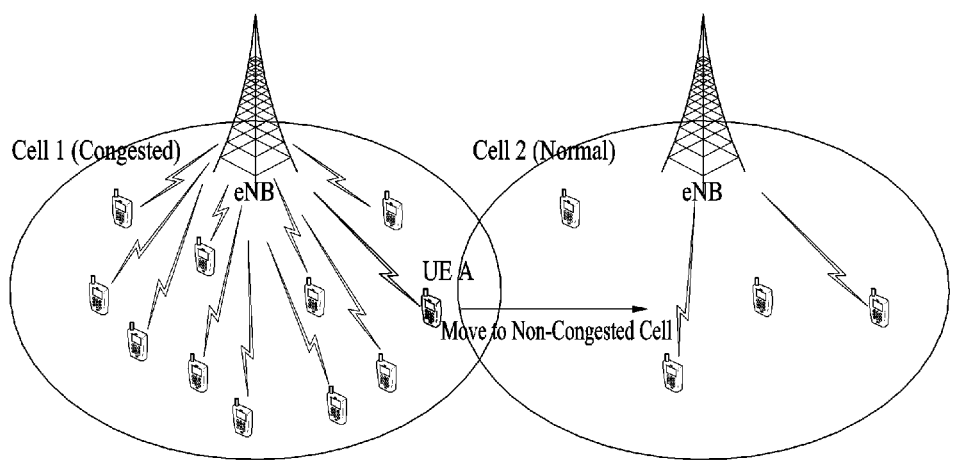
FIG. 10 illustrates an example to which a method of the present invention is applied.

FIG. 10 illustrates an example to which the method of the present invention is applied.

In the example of FIG. 10, when Cell 1 is congested, UE A served in Cell 1 moves to non-congested (or normal) Cell 2.

In this handover situation, a source cell provides congestion control information proposed by the present invention to a target cell, thus overcoming starvation or unfairness and achieving an additional effect.

Specifically, if UE A, which has moved from congested Cell 1 to non-congested Cell 2, has experienced congestion control in Cell 1 (i.e., Cell 1 has assigned a low service priority level to UE A), Cell 2 may be aware of the congestion control of UE A from the congestion control information received during handover of UE A. Also, if Cell 2 has sufficient available resources, Cell 2 may allocate more resources to UE A in order to compensate for service quality degradation that UE A has experienced before the handover. For example, Cell 2 may allocate resources enough to satisfy an Aggregate Maximum Bit Rate (AMBR) set for UE A as much as possible or resources that exceed the AMBR. Accordingly, an average service quality experienced by UE A may be set to a level that UE A generally expects.

Additionally, according to a combined CN-based/RN-based congestion control scheme in which CN-based congestion control and RAN-based congestion control are combined, if a P-GW or a Gateway GPRS Support Node (GGSN) marks flow priority levels for different IP flows within the same bearer, upon occurrence of congestion in a RAN (or eNB), each IP flow is treated differentially. The eNB counts the number of packets discarded due to a low priority level, for each IP flow. If the number exceeds a predetermined threshold, the eNB reports this to the CN (e.g., the P-GW or the GGSN) and thus charging information and a QoS level may be readjusted. If a UE performs handover, congestion control information proposed by the present invention may also be used in the combined CN-based/RN-based congestion control scheme, in order to successfully count the number of packets discarded in a specific IP flow of the UE. That is, a source eNB of the handover may include information about the number of discarded packets counted so far and/or information about a packet discard rate in the congestion control information and transmit the congestion control information to a target eNB. Therefore, if the number of packets discarded for the specific UE (bearer or flow) does not exceed a threshold during counting in the source eNB but the number of discarded packets counted successively by the target eNB exceeds the threshold, the target eNB may report this fact to the CN. Accordingly, even though the UE performs handover, accurate charging/QoS policy may be applied to the UE.

According to the foregoing various examples of the present invention, a method has been proposed, in which if user-plane congestion occurs to a radio access link and a UE (or bearer/flow of the UE) experiencing performance degradation due to differentiation (or assignment of a low priority level) caused by congestion control moves/performs handover to a neighbor eNB/cell, a source eNB/cell provides information indicating whether the UE has been differentiated in the old eNB/cell and details of the differentiation to a target eNB/cell in a handover procedure or by a separate message, thus overcoming starvation and unfairness of the UE and compensating for performance degradation of the UE. Therefore, when handover occurs in a congestion situation, service quality degradation for a specific UE is prevented and performance experienced by the UE is improved substantially. Further, because congestion control information (e.g., the number of packets discarded in an eNB at a RAN level and/or a packet discard rate) about the UE (a specific bearer/flow of the UE) may be maintained and updated even during movement of the UE between cells, charging and policy control may be managed for the UE with continuity.

While the exemplary method depicted in FIG. 8 or FIG. 9 is described as a series of operations, for clarity of description, this does not limit the order of steps. When needed, the steps may be performed at the same time or in a different order. Moreover, all steps depicted in FIG. 8 or FIG. 9 are not needed to implement the method proposed by the present invention.

The method depicted in FIG. 8 or FIG. 9 may be implemented so that the foregoing various embodiments of the present invention may be applied independently or two or more of them may be applied simultaneously.

Figure 11:
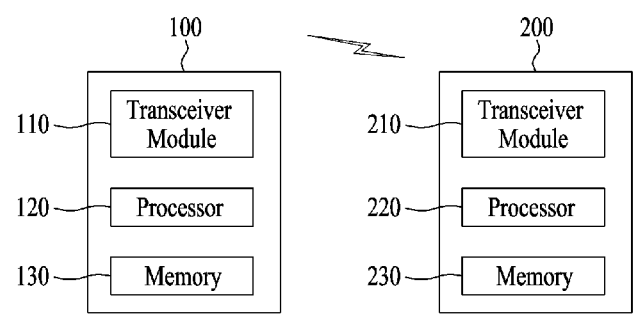
FIG. 11 illustrates a preferred embodiment of a UE apparatus and a network node apparatus according to an example of the present invention.

FIG. 11 is a block diagram of a UE apparatus and a network node apparatus according to an example of the present invention.

Referring to FIG. 11, a UE apparatus 100 according to the present invention may include a transceiver module 110, a processor 120, and a memory 130. The transceiver module 110 may be configured to transmit signals, data, and information to an external device and to receive signals, data, and information from the external device. The UE apparatus 100 may be connected to the external device wiredly and/or wirelessly. The processor 120 may provide overall control to the UE apparatus 100 and may be configured to compute and process information to be transmitted to or received from an external device. The processor 120 may be configured to perform a UE operation according to the present invention. The memory 130 may store the computed and processed information for a predetermined time and may be replaced with a component such as a buffer (not shown).

Referring to FIG. 11, an eNB apparatus 200 according to the present invention may include a transceiver module 210, a processor 220, and a memory 230. The transceiver module 210 may be configured to transmit signals, data, and information to an external device and to receive signals, data, and information from the external device. The eNB apparatus 200 may be connected to the external device wiredly and/or wirelessly. The processor 220 may provide overall control to the eNB apparatus 200 and may be configured to compute and process information to be transmitted to or received from an external device. The processor 220 may be configured to perform an eNB operation according to the present invention. The memory 230 may store the computed and processed information for a predetermined time and may be replaced with a component such as a buffer (not shown).

The specific configurations of the above-described UE apparatus 100 and eNB apparatus 200 may be implemented so that the foregoing various embodiments of the present invention may be applied independently or two or more of them may be applied simultaneously. To avoid redundancy, the same description is not provided herein.

For example, the eNB apparatus 200 may be configured to perform an operation according to an embodiment for a source cell/eNB apparatus or a target cell/eNB apparatus in the examples of the present invention.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The afore-described embodiments of the present invention are applicable to various mobile communication systems.

The invention claimed is:

1. A method for supporting handover by a target cell in a wireless communication system, the method comprising:
receiving, by the target cell from a source cell, congestion control information about a User Equipment (UE), the UE performing handover from the source cell to the target cell; and
performing, by the target cell, radio access network (RAN) based congestion control on the UE based on the congestion control information,
wherein the RAN based congestion control is different from a core network (CN) based congestion control,
wherein the RAN based congestion control is based on a RAN that includes one or more evolved Node Bs, and that is present between the UE and a CN,
wherein the congestion control information includes information indicating whether the source cell has decreased a service priority level for the UE in order to inform the target cell of congestion control history of the UE, and
wherein the congestion control information further includes at least one of information about a delivery time of data with the service priority level decreased for the UE by the source cell, information indicating at least one of a number, amount, and rate of packets discarded for the UE by the source cell, or information indicating whether the at least one of the number, amount, and rate of discarded packets exceeds a predetermined threshold.

2. The method according to claim 1, wherein the performing of congestion control on the UE comprises, if the source cell has continuously decreased the service priority level for the UE, assigning a higher priority level to the UE than a previous priority level set for the UE.

3. The method according to claim 1, wherein the performing of congestion control on the UE comprises, if the source cell has continuously decreased the service priority level for the UE, allowing a bit rate to the UE, the bit rate being equal to or greater than a previous maximum bit rate set for the UE.

4. The method according to claim 1, wherein the congestion control information is included in a message transmitted from the source cell to the target cell during X2 handover.

5. The method according to claim 4, wherein the congestion control information is included in at least one of a handover request message or a Sequence Number (SN) status transfer message.

6. The method according to claim 1, wherein the congestion control information is included in a message transmitted from the source cell to the target cell during S1 handover.

7. The method according to claim 6, wherein the congestion control information is included in at least one of a handover required message, an evolved Node B (eNB) status transfer message, or a UE context release complete message.

8. The method according to claim 1, wherein the congestion control information includes congestion control information for each of one or more bearers, and the congestion control is performed on each of the one or more bearers by the target cell.

9. The method according to claim 1, wherein the congestion control information includes congestion control information for each of one or more flows of a specific bearer for the UE, and the congestion control is performed on each of the one or more flows by the target cell.

10. A method for supporting handover by a source cell in a wireless communication system, the method comprising:
transmitting, by the source cell to a target cell by the source cell, congestion control information about a User Equipment (UE) served,
wherein the congestion control information is used for performing radio access network (RAN) based congestion control on the UE by the target cell, and includes information indicating whether the source cell has decreased a service priority level for the UE in order to inform the target cell of congestion control history of the UE,
wherein the RAN based congestion control is different from a core network (CN) based congestion control,
wherein the RAN based congestion control is based on a RAN that includes one or more evolved Node Bs, and that is present between the UE and a CN, and
wherein the congestion control information further includes at least one of information about a delivery time of data with the service priority level decreased for the UE by the source cell, information indicating at least one of a number, amount, and rate of packets discarded for the UE by the source cell, or information indicating whether the at least one of the number, amount, and rate of discarded packets exceeds a predetermined threshold.

11. A target cell apparatus for supporting handover in a wireless communication system, the target cell apparatus comprising:
a transceiver module; and
a processor,
wherein the processor is configured to control the transceiver module to receive, from a source cell, congestion control information about a User Equipment (UE) performing handover from the source cell to a target cell, and to perform radio access network (RAN) based congestion control on the UE based on the congestion control information,
wherein the RAN based congestion control is different from a core network (CN) based congestion control,
wherein the RAN based congestion control is based on a RAN that includes one or more evolved Node Bs, and that is present between the UE and a CN,
wherein the congestion control information includes information indicating whether the source cell has decreased a service priority level for the UE in order to inform the target cell of congestion control history of the UE, and
wherein the congestion control information further includes at least one of information about a delivery time of data with the service priority level decreased for the UE by the source cell, information indicating at least one of a number, amount, and rate of packets discarded for the UE by the source cell, or information indicating whether the at least one of the number, amount, and rate of discarded packets exceeds a predetermined threshold.

12. A source cell apparatus for supporting handover in a wireless communication system, the source cell apparatus comprising:
a transceiver module; and
a processor,
wherein the processor is configured to control the transceiver module to transmit, to a target cell, congestion control information about a User Equipment (UE) served by a source cell, and
wherein the congestion control information is used for performing radio access network (RAN) based congestion control on the UE by the target cell, and includes information indicating whether the source cell has decreased a service priority level for the UE in order to inform the target cell of congestion control history of the UE,
wherein the RAN based congestion control is different from a core network (CN) based congestion control,
wherein the RAN based congestion control is based on a RAN that includes one or more evolved Node Bs, and that is present between the UE and a CN, and
wherein the congestion control information further includes at least one of information about a delivery time of data with the service priority level decreased for the UE by the source cell, information indicating at least one of a number, amount, and rate of packets discarded for the UE by the source cell, or information indicating whether the at least one of the number, amount, and rate of discarded packets exceeds a predetermined threshold.

* * * * *